US011163110B2

(12) United States Patent
Liao et al.

(10) Patent No.: US 11,163,110 B2
(45) Date of Patent: Nov. 2, 2021

(54) OPTICAL FIBER DEVICE HAVING POLYMER MICRONANO STRUCTURE INTEGRATED IN OPTICAL FIBER AND PREPARATION METHOD THEREOF

(71) Applicant: SHENZHEN UNIVERSITY, Guangdong (CN)

(72) Inventors: Changrui Liao, Guangdong (CN); Yiping Wang, Guangdong (CN); Chi Li, Guangdong (CN); Lei Xu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 161 days.

(21) Appl. No.: 16/672,539

(22) Filed: Nov. 4, 2019

(65) Prior Publication Data

US 2020/0064545 A1    Feb. 27, 2020

Related U.S. Application Data

(63) Continuation of application No. PCT/CN2018/092403, filed on Jun. 22, 2018.

(51) Int. Cl.
*G02B 6/02*    (2006.01)

(52) U.S. Cl.
CPC ..... *G02B 6/02328* (2013.01); *G02B 6/02123* (2013.01)

(58) Field of Classification Search
CPC .............. G02B 6/02328; G02B 6/02123
See application file for complete search history.

(56) References Cited

U.S. PATENT DOCUMENTS

| 2006/0219676 A1* | 10/2006 | Taylor | G02B 6/107 219/121.69 |
| 2011/0090570 A1* | 4/2011 | DeCusatis | B29C 37/0067 359/619 |
| 2013/0084037 A1* | 4/2013 | Xia | G01N 21/45 385/12 |

FOREIGN PATENT DOCUMENTS

| CN | 101000394 A | * | 7/2007 |
| CN | 101022311 A | * | 8/2007 |
| CN | 102374972 A | * | 3/2012 |
| CN | 102768381 A | * | 11/2012 |
| CN | 103018819 A | * | 4/2013 |
| CN | 103227416 A | * | 7/2013 |
| CN | 105356208 A | * | 2/2016 |
| CN | 107608022 A | * | 1/2018 |
| CN | 110186875 A | * | 8/2019 |

(Continued)

*Primary Examiner* — Thomas A Hollweg
*Assistant Examiner* — Mary A El-Shammaa (57) ABSTRACT

The present disclosure provides a preparation method of an optical fiber device having a polymer micronano structure integrated in an optical fiber, the method comprising: welding a hollow optical fiber so that the hollow optical fiber is welded between two solid optical fibers, ablating the welded hollow optical fiber utilizing a femtosecond laser ablation technology so that a channel vertical to an inner wall is ablated on the hollow optical fiber, filling a colorless and transparent liquid photoresist material inside the hollow optical fiber which has been ablated so that the inside of the hollow optical fiber is filled with the photoresist material, and polymerizing on the photoresist material inside the hollow optical fiber utilizing a femtosecond laser two-photon polymerization technology.

9 Claims, 7 Drawing Sheets

(56) References Cited

FOREIGN PATENT DOCUMENTS

WO     WO-2016112422 A1 * 7/2016 ........... G02B 6/0208

* cited by examiner

FIG. 1

FIG. 2 channel

OPTICAL FIBER DEVICE HAVING POLYMER MICRONANO STRUCTURE INTEGRATED IN OPTICAL FIBER AND PREPARATION METHOD THEREOF

CROSS-REFERENCE TO RELATED APPLICATION

This application is a continuation of International Application No. PCT/CN2018/092403, filed on Jun. 22, 2018, the entire content of which is incorporated herein by reference.

TECHNICAL FIELD

The disclosure relates to the field of optical fiber sensing, and particularly relates to an optical fiber device having a polymer micronano structure integrated in an optical fiber and the preparation method thereof.

BACKGROUND

Compared with quartz, the polymer material is more prospective application to the field of optical fiber sensing or communication due to its extremely good material characteristics, the polymer Fiber Bragg Grating device prepared from the polymer material has higher sensitivity, and is expected to be used for monitoring of a temperature in a living body.

The existing methods for preparing this polymer function microstructure are as follows: the ion beam printing method, the two-photon polymerization processing method, the ultraviolet mask exposure method and the like, wherein, utilization of the ion beam printing method is to perform processing only on a plane and cannot achieve processing of a complex three-dimensional structure, thus, the processed equipment does not facilitate integration of optical fiber systems; the two-photon polymerization processing method can achieve the processing of the complex three-dimensional polymer microstructure, but cannot well achieve optical fiber integration due to limitation of poor mechanical property of a polymer; regarding the polymer structure prepared by the ultraviolet mask exposure method, the Bragg Grating is prepared generally in a polymer optical fiber, this production method is single and has processing limitation, and the polymer optical fiber does not facilitate welding with silica optical fiber, thus, the polymer structure prepared by this method does not facilitate integration of optical fiber systems. None of the above existing methods for preparing the polymer function microstructure can well combine the material characteristics of the polymer with the transmission characteristic of the optical fiber to achieve integration of the complex polymer function microstructure and the optical fiber.

SUMMARY

The main objective of the present disclosure is to provide an optical fiber device having a polymer micronano structure integrated in an optical fiber and the preparation method thereof to solve the technical problem of integration of the complex polymer function microstructure and the optical fiber, which cannot be achieved by the existing technology.

In order to achieve the above objective, the first aspect of the disclosure provides a preparation method of an optical fiber device having a polymer micronano structure integrated in an optical fiber, the method comprising:

welding a hollow optical fiber so that the hollow optical fiber is welded between two solid optical fibers;

ablating the welded hollow optical fiber utilizing a femtosecond laser ablation technology so that a channel vertical to an inner wall is ablated on the hollow optical fiber;

filling a colorless and transparent liquid photoresist material inside the hollow optical fiber which has been ablated so that the inside of the hollow optical fiber is sufficiently filled with the photoresist material;

polymerizing the photoresist material inside the hollow optical fiber utilizing a femtosecond laser two-photon polymerization technology, and then washing the polymerized hollow optical fiber utilizing developing solution to obtain the optical fiber device having the polymer micronano structure integrated in the optical fiber.

The second aspect of the present disclosure provides an optical fiber device having a polymer micronano structure integrated in an optical fiber, the optical fiber device having the polymer micronano structure integrated in the optical fiber comprising solid optical fibers, a hollow optical fiber and a colorless and transparent photoresist material;

the hollow optical fiber is welded between two of the solid optical fibers;

the channel of the hollow optical fiber is vertical to the inner wall of the hollow optical fiber;

the photoresist material is in the channel inside the hollow optical fiber;

the channel inside the hollow optical fiber has the polymer micronano structure.

The disclosure provides an optical fiber device having a polymer micronano structure integrated in an optical fiber and a preparation method thereof. This method is that the hollow optical fiber is welded with the solid optical fibers, then the polymer micronano structure is prepared inside the hollow optical fiber so that the obtained optical fiber device having the polymer micronano structure integrated in the optical fiber has polymer function characteristics. Meanwhile, since the two ends of the optical fiber device having the polymer micronano structure integrated in the optical fiber are the solid optical fibers, the two ends of the optical fiber device having the polymer micronano structure integrated in the optical fiber are conveniently welded with other silica fibers, and the material characteristics of the polymer are combined with the transmission characteristic of the optical fiber, thereby achieving the integration of the complex polymer function microstructure with the optical fibers.

BRIEF DESCRIPTION OF THE DRAWINGS

For better clearly illustrating the technical solution in the embodiments of the disclosure or the prior art, drawings required to be used in the description of the embodiments or the prior art will be simply described, apparently, the drawings described below are only some embodiments of the disclosure, and those skilled in the art can also obtain other drawings based on these drawings without any creative efforts.

DESCRIPTION OF THE EMBODIMENTS

To make the purpose, the features and the advantages of the disclosure more apparent and understandable, a clear and complete description is provided to the technical solution in the embodiments of the disclosure in combination with drawings in embodiments of the disclosure, apparently, the described embodiments are only parts of embodiments but not all the embodiments. Based on the embodiments of the disclosure, other embodiments obtained by those skilled in the art without any creative efforts are all included in the protection scope of the disclosure.

Since the existing technology cannot achieve the technical problem of integration of a complex polymer function microstructure and optical fibers, the present disclosure provides a preparation method of an optical fiber device having a polymer micronano structure integrated in an optical fiber, in order to solve the above technical problem.

Figure 1:
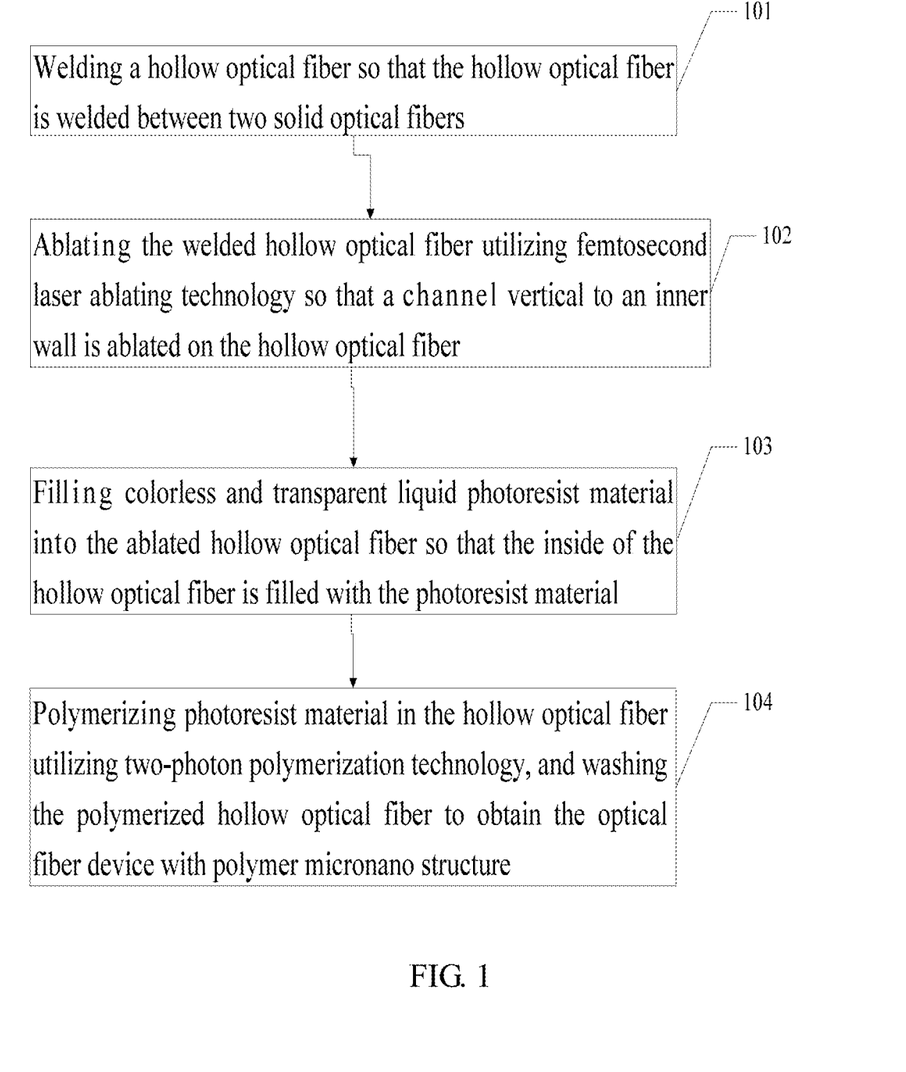
FIG. 1 is a flow chart of the preparation method of an optical fiber device having a polymer micronano structure integrated in an optical fiber according to the first embodiment of the disclosure.

Referring to FIG. 1, FIG. 1 is a flow chart of the preparation method of an optical fiber device having a polymer micronano structure integrated in an optical fiber according to the first embodiment of the disclosure. The method comprises:

Step 101, welding a hollow optical fiber so that the hollow optical fiber is welded between two solid optical fibers.

Particularly, parameters of a welding machine are set, and the hollow optical fiber is welded between the two solid optical fibers utilizing the welding machine.

Figure 2:
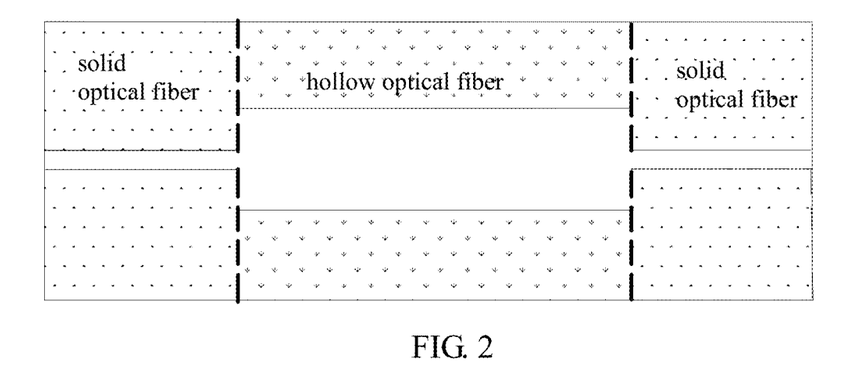
FIG. 2 is a diagram of a hollow optical fiber welded with two solid optical fibers.

Referring to FIG. 2, FIG. 2 is a diagram of a hollow optical fiber welded with two solid optical fibers. The hollow optical fiber is connected between the two solid optical fibers, wherein the outer diameter of the hollow optical fiber is the same as the outer diameters of the two solid optical fibers, the inner diameter of the hollow optical fiber is larger than the diameter of the fiber core of the solid optical fiber, wherein, the hollow region has an outer wall. The features of the outer wall are not shown in FIG. 2.

Optionally, the hollow optical fiber can also be replaced with a capillary quartz glass tube.

Step 102, ablating the welded hollow optical fiber utilizing a femtosecond laser ablation technology so that a channel vertical to an inner wall is ablated on the hollow optical fiber.

Figure 3:
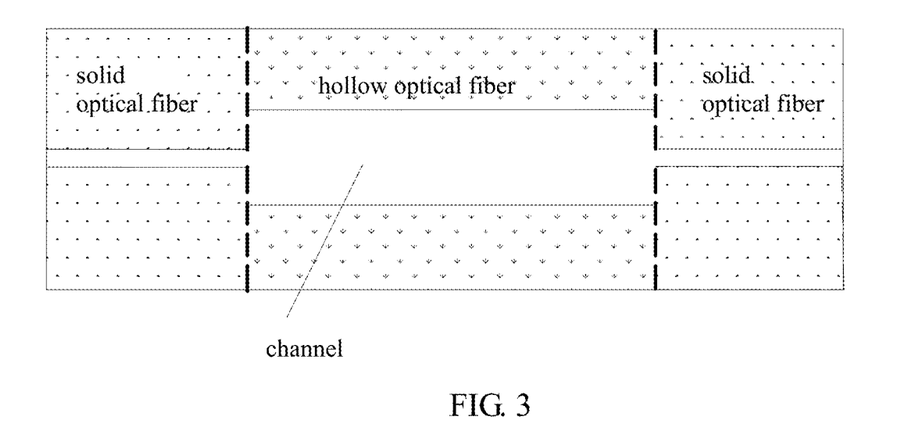
FIG. 3 is a diagram of a hollow optical fiber after ablation.

Particularly, the hollow optical fiber which has been welded is fixed on a three-diameter displacement platform having rotation clamps, oppositely penetrated grooves are ablated in the vertical direction of the hollow optical fiber by rotating the rotation clamp 180° for many times and utilizing the femtosecond laser ablation technology, the ablated grooves are vertical to the inner wall (namely, a hollow groove in a normal direction of a cambered surface of an inner wall); as shown in FIG. 3, FIG. 3 is a diagram of a hollow optical fiber after ablation, in which the ablation is to ablate the outer wall of the hollow core so that the oppositely penetrated grooves ablated inside the hollow optical fiber are communicated to form a hollow groove inside the hollow optical fiber.

In particular, the three-diameter displacement platform has two rotation clamps, the two solid optical fibers connected to the two ends of the hollow optical fiber are respectively fixed on the two rotation clamps, so that the hollow optical fiber suspends between the two rotation clamps, thereby achieving a purpose of fixing the hollow optical fiber on the three-diameter displacement platform so as to ablate the hollow optical fiber using the femtosecond laser ablating technology.

Step 103, filling a colorless and transparent liquid photoresist material inside the hollow optical fiber which has been ablated so that the inside of the hollow optical fiber is sufficiently filled with the photoresist material.

In particular, after the hollow optical fiber is ablated, the channel is formed inside the hollow optical fiber, a liquid photoresist material are dropped in the channel of the hollow optical fiber to stand for a period of time which can be 1-10 minutes. After standing, the photoresist material is sufficiently filled in the channel of the hollow optical fiber to be convenient for other operations on the photoresist material later. Meanwhile, the photoresist material is a colorless and transparent body, and can spread light in a polymer waveguide as an optical waveguide.

It should be understood that in the solution of the present application, other colorless and transparent polymer materials can also be selected to replace the photoresist material.

Step 104, polymerizing on the photoresist material inside the hollow optical fiber utilizing the femtosecond laser two-photon polymerization technology, and then washing the polymerized hollow optical fiber utilizing developing solution to obtain the optical fiber device having the polymer micronano structure integrated in the optical fiber.

Figure 4:
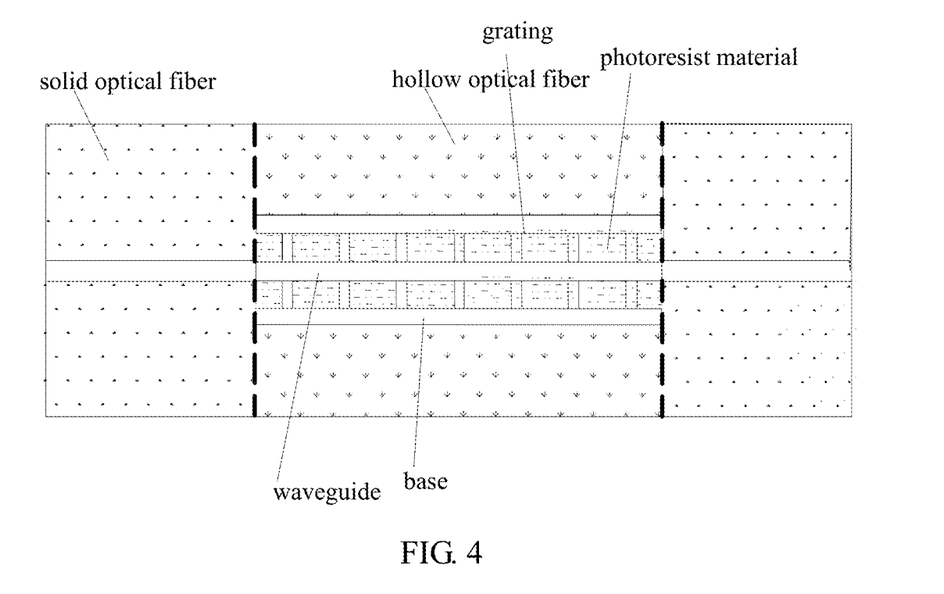
FIG. 4 is a diagram of a photoresist material inside the hollow optical fiber after polymerization.
Figure 5:
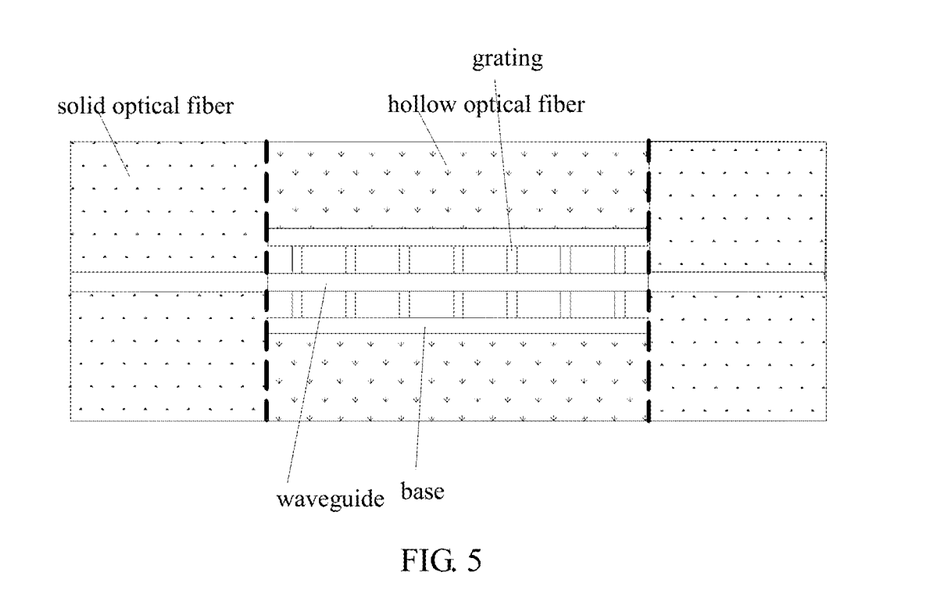
FIG. 5 is a structural diagram of an optical fiber device having a polymer micronano structure integrated in an optical fiber according to the first embodiment of the disclosure.

Particularly, the photoresist material inside the hollow optical fiber is polymerized utilizing the femtosecond laser two-photon polymerization technology, and an effect after polymerization is as shown in FIG. 4. FIG. 4 is a diagram of a photoresist material inside a hollow optical fiber after polymerization, the inside of the hollow optical fiber after polymerization is of a grating structure and has a waveguide and a base, but still has the unsolidified liquid photoresist material, after that, the hollow optical fiber which has been polymerized is washed utilizing developing solution to wash away the unsolidified liquid photoresist material to obtain a finished product optical fiber device having the polymer micronano structure integrated in the optical fiber. The obtained product optical fiber device having the polymer micronano structure integrated in the optical fiber is as shown in FIG. 5. FIG. 5 is a structural diagram of an optical fiber device having a polymer micronano structure integrated in an optical fiber according to a first embodiment of the disclosure, and the inside of the hollow optical fiber is of a grating structure.

In particular, the developing solution is a mixture of acetone and isopropanol under a specific ratio. In addition, the structure features of the polymer micronano structure are controlled by adopting the programmable control three-dimensional platform. The three-dimensional displacement platform has integrated software, and polymerization of the three-dimensional displacement platform on the photoresist material is controlled by utilizing the program of the integrated software, thereby controlling the structure features of the polymer micronano structure formed by polymerization. The structure features include structure size, structure morphology and the like, and meanwhile properties changed due to change in structure features are controlled, such as optical grating reflectivity. Thus, programming simulation is performed on the integrated software of the three-dimensional displacement platform to obtain an ideal polymer micronano structure.

Further, the femtosecond laser two-photon polymerization technology adopts a femtosecond laser having a near-infrared band, the range of laser repetition frequency is between 1 kHz and 1 MHz, and the range of the laser impulse width is 25 femtoseconds~300 femtoseconds. In the embodiment of the disclosure, the repetition frequency of the laser impulse output by the femtosecond laser is 1 kHz~1 MHz, and is adjustable. The laser device is adjusted to form an impulse width of 80 femtoseconds and output a laser wavelength of 1026 nm.

It should be noted that the femtosecond laser is adopted in the femtosecond ablating technology, and the detail parameter values of this femtosecond laser are not described in detail again.

Further, a step after step 102 and before step 103 also comprises: washing the ablated hollow optical fiber.

Particularly, the two solid optical fibers are fixed on the same glass plate with bonding adhesive so that the hollow optical fiber is fixed between the two solidification points of the glass plate, the hollow optical fiber fixed on the glass plate is immersed into an ultrasonic machine with alcohol for ultrasonic washing to wash away chips and impurities generated during the ablation so that the chips and impurities do not influence polymerization of the photoresist material when the photoresist material is sufficiently filled in the inside of the hollow optical fiber later.

In particular, the bonding adhesive adopts ultraviolet solidification adhesive, the solid optical fibers at the two ends of the hollow optical fiber are fixed on the same glass plate utilizing the ultraviolet solidification adhesive, then the glass plate and the hollow optical fiber are entirely immersed into the ultrasonic washing machine with alcohol for washing to wash away the chips and impurities generated during the ablation, then the liquid photoresist material is dropped into the channel of the hollow optical fiber to stand for a period of time so that the photoresist is sufficiently fixed in the channel of the hollow optical fiber, then a layer of thin glass plate covers on the hollow optical fiber and is fixed on a precise programmable control air-suspending three-dimensional displacement platform, and finally, polymerization is performed on the photoresist material inside the hollow optical fiber utilizing the femtosecond laser two-photon polymerization technology and the liquid photoresist material is washed utilizing the acetone and isopropanol mixed solution having the specific ratio to obtain the optical fiber device having the polymer micronano structure integrated in the optical fiber.

It can be seen from the preparation method of an optical fiber device having a polymer micronano structure integrated in an optical fiber according to the first embodiment of the disclosure in FIG. 1 that by this method, the hollow optical fiber is welded with the solid optical fibers, then the polymer micronano structure is prepared inside the optical fiber so that the optical fiber device having the polymer micronano structure integrated in the optical fiber has polymer function characteristics. Meanwhile since the two ends of the optical fiber device having the polymer micronano structure integrated in the optical fiber are the solid optical fibers, the two ends of the optical fiber device having the polymer micronano structure integrated in the optical fiber is conveniently connected with other silica fibers, the optical fiber device having the polymer micronano structure integrated in the optical fiber well combines the material characteristics with the transmission characteristics of the optical fiber so as to achieve the integration of the complex polymer function microstructure and the optical fiber.

Figure 6:
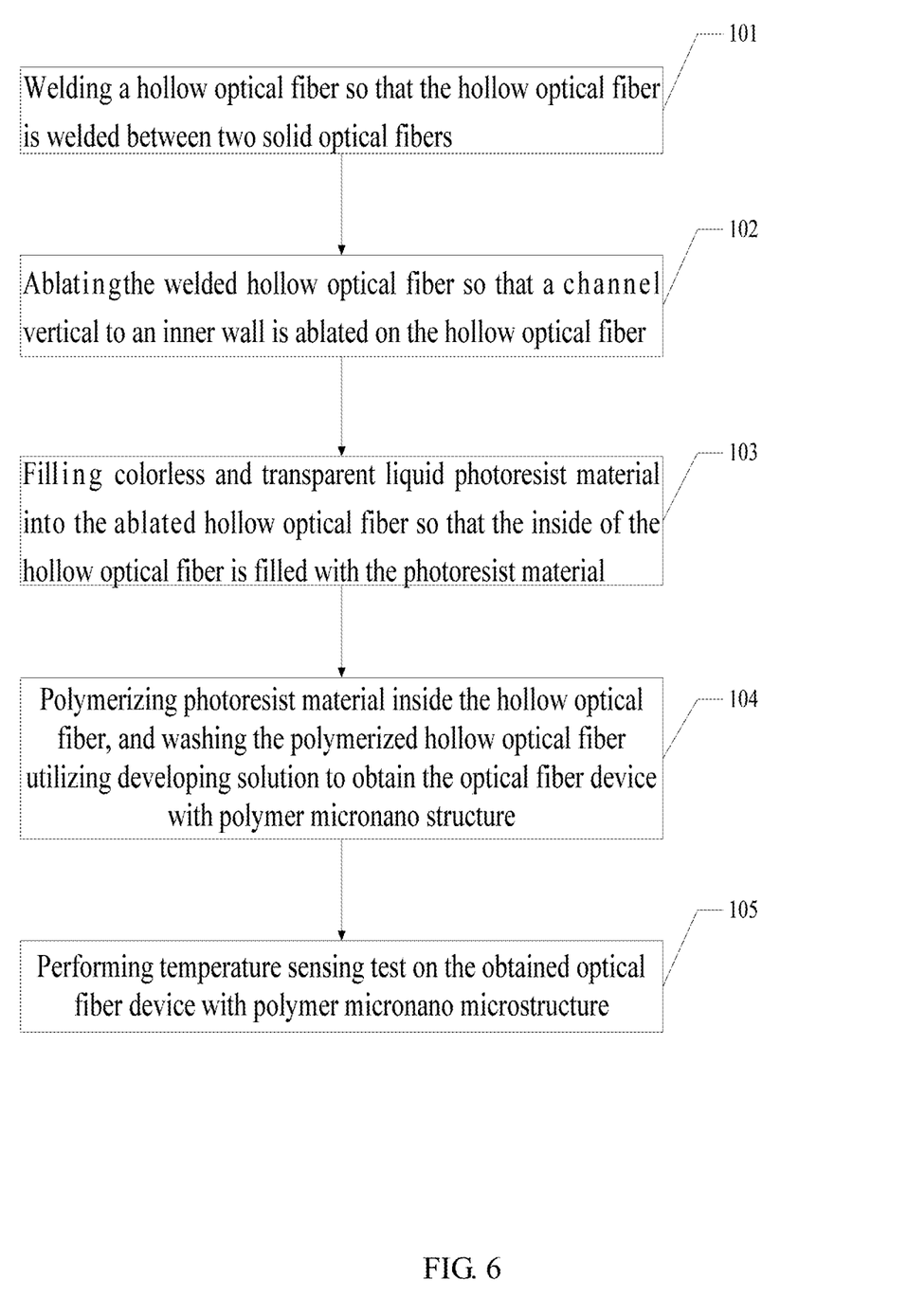
FIG. 6 is a flow chart of the preparation method of an optical fiber device having a polymer micronano structure integrated in an optical fiber according to the second embodiment of the disclosure.

Referring to FIG. 6, FIG. 6 is a flow chart of the preparation method of an optical fiber device having a polymer micronano structure integrated in an optical fiber according to the second embodiment of the disclosure. This method also comprises: step 105, performing temperature sensing test on the obtained optical fiber device having the polymer micronano structure integrated in the optical fiber.

The step 105 specifically comprises: putting the obtained optical fiber device having the polymer micronano structure integrated in the optical fiber into a temperature-controllable closed temperature furnace, connecting the left end of the optical fiber device having the polymer micronano structure integrated in the optical fiber to an output end of a broadband light source, connecting the right end of the optical fiber device having the polymer micronano structure integrated in the optical fiber to an input end of a spectrograph, and testing the response of the optical fiber device having the polymer micronano structure integrated in the optical fiber on the temperature through control of the temperature in the closed temperature furnace.

Figure 7:
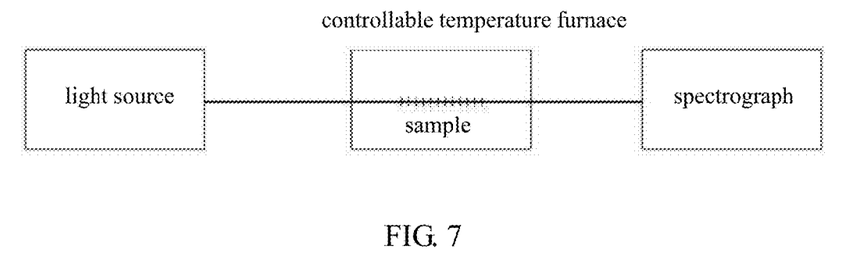
FIG. 7 is a diagram showing an optical fiber device having a polymer micronano structure integrated in an optical fiber is subjected to a temperature sensing test.

Particularly, as shown in FIG. 7, FIG. 7 is a diagram showing an optical fiber device having a polymer micronano structure integrated in an optical fiber is subjected to a temperature sensing test. A sample is the obtained optical fiber device having the polymer micronano structure integrated in the optical fiber. This optical fiber device having the polymer micronano structure integrated in the optical fiber is located in the closed temperature furnace, the left end of the optical fiber device having the polymer micronano structure integrated in the optical fiber is connected to the output end of the broadband light source, the right end of the optical fiber device having the polymer micronano structure integrated in the optical fiber is connected to the input end of the spectrograph, and the response of the optical fiber device having the polymer micronano structure integrated in the optical fiber on the temperature is tested through control of the temperature in the closed temperature furnace.

Figure 8:
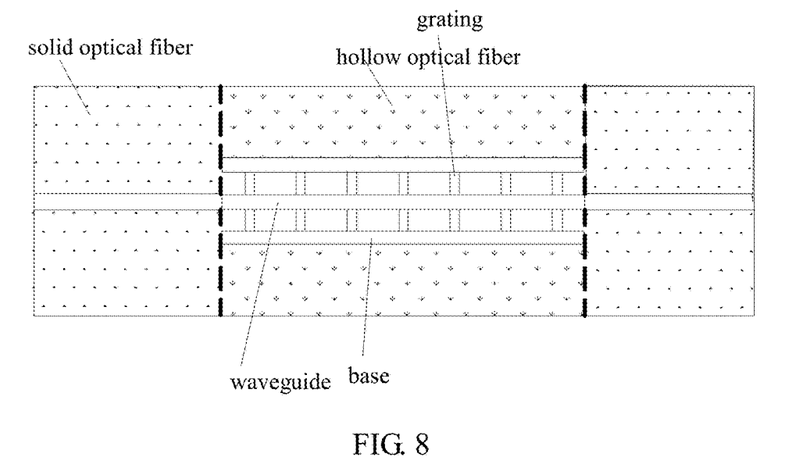
FIG. 8 is a structural diagram of an optical fiber device having a polymer micronano structure integrated in an optical fiber according to the second embodiment of the disclosure.

Preferably, as shown in FIG. 8, FIG. 8 is a structural diagram of an optical fiber device having a polymer micronano structure integrated in an optical fiber according to the second embodiment of the disclosure. In the embodiment of the disclosure, the inner diameter and the outer diameter of the hollow optical fiber in the optical fiber device having the polymer micronano structure integrated in the optical fiber are respectively 30 um and 125 um, the solid optical fiber adopts a single mode optical fiber, a section of hollow optical fiber is welded between the two single mode optical fibers utilizing a welding machine, the discharge capacity and the discharge time of the welding machine are controlled well so as to avoid the collapse of the glass tube of the hollow optical fiber due to too-high discharge capacity, or insufficient welding strength caused by deficient discharge capacity, and thus the model of the welding machine adopted by the embodiment of the disclosure is Tengcang 80S, optimized discharge parameters are as follows: MMF mode, −10 discharge capacity and 400 ms, the hollow optical fiber having the inner diameter of 30 um and the outer diameter of 125 um is well welded between the two single mode optical fibers and then subjected to operations of step 102 and step 104 in the first embodiment to obtain the optical fiber device having the polymer micronano structure integrated in the optical fiber.

Figure 9:
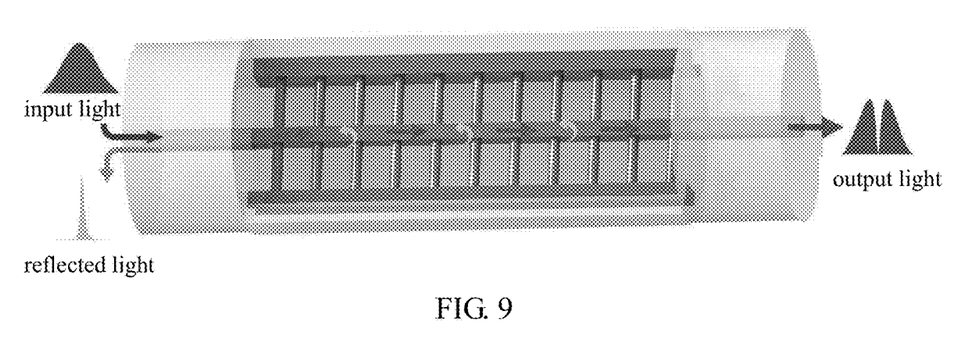
FIG. 9 is a structural diagram of an optical fiber device having a polymer micronano structure integrated in an optical fiber.

It should be noted that the hollow optical fiber of the optical fiber device having the polymer micronano structure integrated in the optical fiber has the internal structure of is polymer Fiber Bragg Grating. As shown in FIG. 9, FIG. 9 is a structural diagram of an optical fiber device having a polymer micronano structure integrated in an optical fiber. Due to modulation with the middle polymer Bragg Grating, an incident light entering from the left end can generate a resonance valley at the emergent end and can generate a resonance peak at the reflection end. When the external temperature environment changes, the resonate refractive index of the material can generate a correspondingly changed resonate refractive index due to a thermal-optic effect so as to lead to drifting of the Bragg resonance wavelength. The external temperature change can be calibrated by detecting the drifting change of the resonance wavelength, wherein, an equation meeting the Bragg effect is as follows:

$$m\lambda_b = 2n\Lambda,$$

wherein, m is an order of Bragg Grating, $\lambda_b$ is the Bragg resonance wavelength, n is an effective refractive index of a light propagation medium, and $\Lambda$ is a grating coefficient of Bragg Grating.

Figure 10:
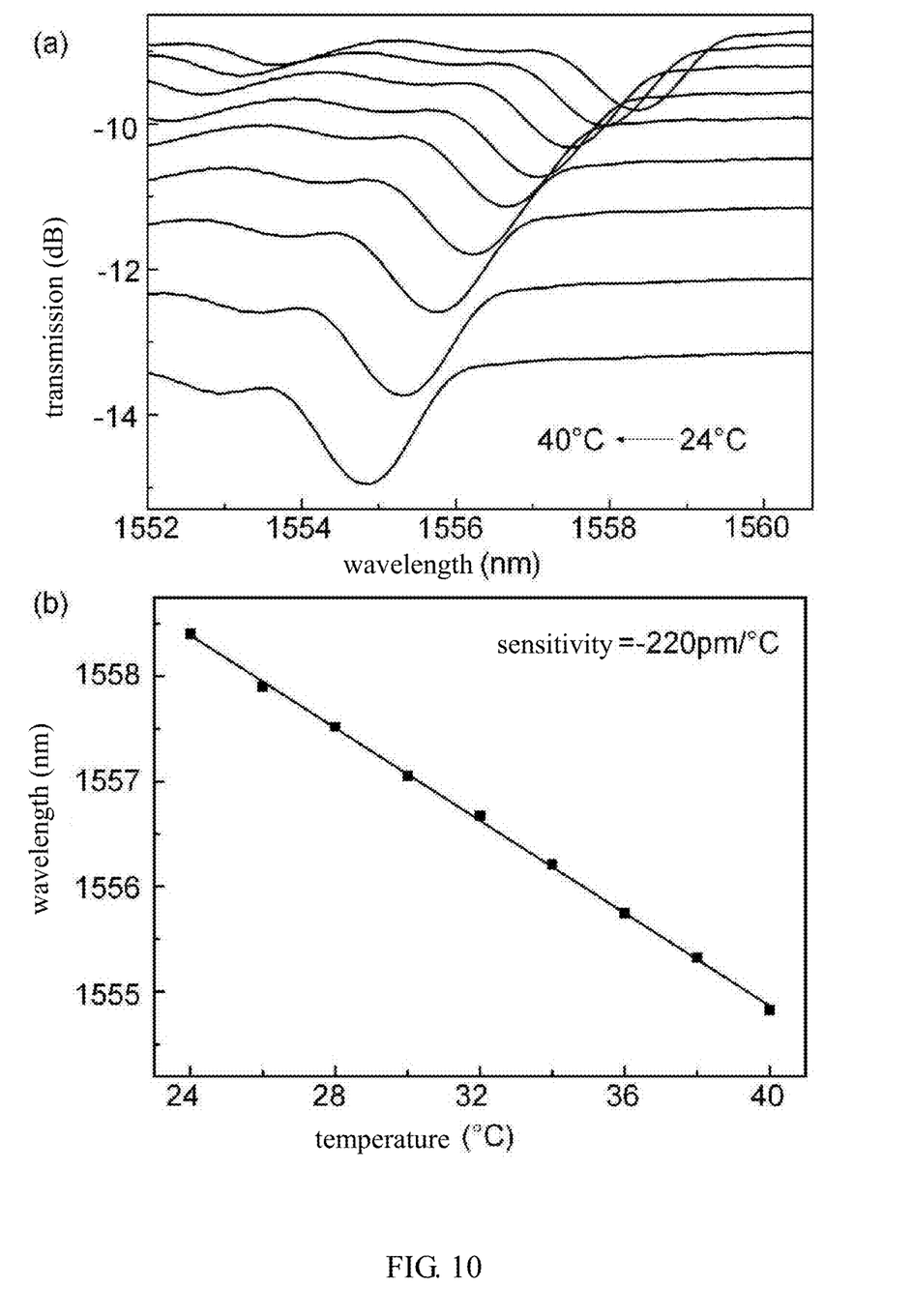
FIG. 10 is a spectrum drifting transmitted spectrogram of a temperature sensing test and a variation diagram of fitting wavelengths along with temperatures according to the second embodiment of the disclosure.

In the embodiment of the disclosure, as shown in FIG. 10, FIG. 10 is a spectrum drifting transmitted spectrogram of a temperature sensing test and a variation diagram of fitting wavelengths along with temperatures according to the second embodiment of the disclosure. FIG. 10 (*a*) is a diagram located on the top of FIG. 10, FIG. 10 (*b*) is a diagram located at the bottom of FIG. 10, FIG. 10 (*a*) is a spectrum drifting transmitted spectrogram of a temperature sensing test, and FIG. 10 (*b*) is a variation diagram of fitting wavelengths along with temperatures. As shown in FIG. 10 (*a*), the Bragg resonance wavelength is 1558.5 nm at 24° C., and the temperature in the temperature furnace gradually rises from 24° C. to 40° C. by 2° C. each time. FIG. 10 (*a*) shows that the Bragg resonance wavelength is obviously moved to a short wavelength direction along with gradual rise of the temperature; due to the high thermal-optic coefficient of the polymer, the thermal-optical effect leads to change in the refractive index of the polymer material when the external temperature rises, thereby resulting in a change relationship between the temperature and the resonance wavelength. It can be seen from FIG. 10 (*b*) that the optical fiber device having the polymer micronano structure integrated in the optical fiber obtained by the embodiment of the disclosure has good linear sensitivity, and the temperature sensitivity obtained by temperature sensing test is −220 pm/° C., which is obviously improved as compared with the Bragg temperature sensor sensitivity made based on the polymer optical fiber.

Further, this method also comprises: determining whether the optical fiber device having the polymer micronano structure integrated in the optical fiber is a sample meeting requirements of sensitivity obtained by a temperature sensing test. If the sensitivity is high, the obtained optical fiber device having the polymer micronano structure integrated in the optical fiber is a required device having the polymer function characteristic; if the sensitivity is low, the device is abandoned, and this device is obtained again according to the method in the first embodiment.

It can be seen from the preparation method of an optical fiber device having a polymer micronano structure integrated in an optical fiber according to the second embodiment of the disclosure in FIG. 6 that in the first aspect, the optical fiber device having the polymer micronano structure integrated in the optical fiber well combines the material characteristic of the polymer with the transmission characteristic of the optical fiber to achieve the integration of the complex polymer function microstructure and the optical fibers; in the second aspect, the result from the temperature sensing test on the obtained optical fiber device having the polymer micronano structure integrated in the optical fiber shows that the optical fiber device having the polymer micronano structure integrated in the optical fiber is relatively high in sensitivity.

Figure 11:
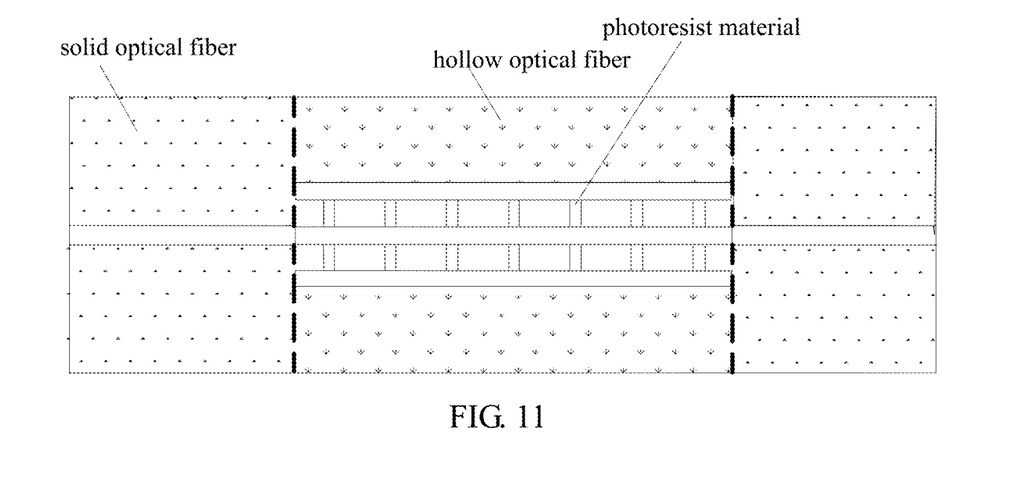
FIG. 11 is a structural diagram of an optical fiber device having a polymer micronano structure integrated in an optical fiber according to a third embodiment of the disclosure.

Referring to FIG. 11, FIG. 11 is a structural diagram of an optical fiber device having a polymer micronano structure integrated in an optical fiber according to the third embodiment of the disclosure. This optical fiber device having the polymer micronano structure integrated in the optical fiber includes solid optical fibers, a hollow optical fiber and a colorless and transparent photoresist material;

the hollow optical fiber is welded between the two solid optical fibers, the channel of the hollow optical fiber is vertical to the inner wall of the hollow optical fiber, this photoresist material is located in the channel inside the hollow optical fiber, and the photoresist material in the channel inside the hollow optical fiber is of a polymer micronano structure.

In particular, the outer diameter of the hollow optical fiber is the same as the outer diameters of the two solid optical fibers, and the inner diameter of the hollow optical fiber is larger than the diameter of the fiber core of the solid optical fiber.

Preferably, the polymer micronano structure in the photoresist material is a grating structure, the internal structure of the hollow optical fiber of the optical fiber device having the polymer micronano structure integrated in the optical fiber is specifically polymer grating Bragg Grating which has relatively high sensitivity, and therefore the optical fiber device having the polymer micronano structure integrated in the optical fiber has relatively high sensitivity.

It can be seen from the structural diagram of an optical fiber device having a polymer micronano structure integrated in an optical fiber according to a third embodiment of the disclosure in FIG. 11 that the hollow optical fiber in the optical fiber device having the polymer micronano structure integrated in the optical fiber has connected with two solid optical fibers, and the inside of the hollow optical fiber has a polymer micronano structure so that the optical fiber device having the polymer micronano structure integrated in the optical fiber has polymer function characteristics. Meanwhile, since the two ends of the optical fiber device having the polymer micronano structure integrated in the optical fiber are solid optical fibers, the two ends of the optical fiber device having the polymer micronano structure integrated in the optical fiber are conveniently welded with other silica optical fibers, the material characteristics of the polymer are well combined with the transmission characteristics of the optical fiber, integration of the complex polymer microstructure and the optical fiber is achieved, and an optical fiber communication optical device is developed toward miniaturization.

It should be noted that, for simply description, the foregoing various method embodiments are described into a series of action combinations, it is understood by those skilled in the art that the disclosure is not limited by the described action sequence, as some steps can be carried out adopting other sequences or simultaneously carried out according to the disclosure. Next, it is understood by those skilled in that embodiments described in the specification are all preferred embodiments, involved actions and modules are not necessarily required by the disclosure.

In the above embodiments, description of each embodiment has its own emphasis, parts that are described in detail in some embodiments can refer to relevant descriptions of other embodiments.

The above is description of the optical fiber device having the polymer micronano structure integrated in the optical fiber and the preparation method thereof, and those skilled in the art can made variations to embodiments and application scopes according to the thought of the embodiments of the disclosure. In summary, the contents of the disclosure should not be understood as limitation of the disclosure.

What is claimed is:

1. A preparation method of an optical fiber device having a polymer micronano structure integrated in an optical fiber, wherein the method comprises:
    welding a hollow optical fiber in such a way that the hollow optical fiber is welded between two solid optical fibers;
    ablating the welded hollow optical fiber utilizing a femtosecond laser ablation technology in such a way that a channel vertical to an inner wall is ablated on the hollow optical fiber;
    filling a colorless and transparent liquid photoresist material inside the hollow optical fiber which has been ablated in such a way that the inside of the hollow optical fiber is filled with the photoresist material;
    and polymerizing the photoresist material inside the hollow optical fiber utilizing a femtosecond laser two-photon polymerization technology, and washing the polymerized hollow optical fiber utilizing developing solution to obtain the optical fiber device having the polymer micronano structure integrated in the optical fiber.

2. The method of claim 1, wherein the hollow optical fiber has an outer diameter as same as outer diameters of the two solid optical fibers, the hollow optical fiber has an inner diameter larger than diameter of the fiber core of the solid optical fibers.

3. The method of claim 1, wherein the ablating the welded hollow optical fiber utilizing a femtosecond laser ablation technology in such a way that a channel vertical to an inner wall is ablated on the hollow optical fiber comprises:
    fixing the hollow optical fiber which has been welded on a three-diameter displacement platform having rotation clamps; and
    ablating oppositely penetrated grooves in the vertical direction of the hollow optical fiber by rotating the rotation clamp 180° for a plurality of times and utilizing the femtosecond laser ablation technology.

4. The method of claim 1, wherein there is a step between ablating the welded hollow optical fiber utilizing a femtosecond laser ablation technology in such a way that a channel vertical to an inner wall is ablated on the hollow optical fiber and filling a colorless and transparent liquid photoresist material inside the hollow optical fiber which has been ablated in such a way that the inside of the hollow optical fiber is filled with the photoresist material, which comprises:
    fixing the two solid optical fibers on a same glass plate with bonding adhesive so that the hollow optical fiber is fixed between two solidification points of the glass plate; and
    immersing the hollow optical fiber fixed on the glass plate into an ultrasonic machine with alcohol for ultrasonic washing.

5. The method of claim 1, wherein the polymerizing on the photoresist material inside the hollow optical fiber utilizing a femtosecond laser two-photon polymerization technology so as to obtain the optical fiber device having the polymer micronano structure integrated in the optical fiber further comprises:
    controlling the structure features of the polymer micronano structure by adopting the programmable control three-dimensional platform.

6. The method of claim 1, wherein the femtosecond laser two-photon polymerization technology adopts a femtosecond laser having a near-infrared band, the range of laser repetition frequency is between 1 kHz and 1 MHz, and the range of the laser impulse width is between 25 femtoseconds and 300 femtoseconds.

7. The method of claim 1, wherein the developing solution is a mixture of acetone and isopropanol with a specific ratio.

8. The method of claim 1, wherein the method further comprises:
    putting the obtained optical fiber device having the polymer micronano structure integrated in the optical fiber into a temperature-controllable closed temperature furnace, connecting a left end of the optical fiber device having the polymer micronano structure integrated in the optical fiber to an output end of a broadband light source, connecting a right end of the optical fiber device having the polymer micronano structure integrated in the optical fiber to an input end of a spectrograph, and testing the response of the optical fiber device having the polymer micronano structure integrated in the optical fiber on the temperature through control of the temperature in the closed temperature furnace.

9. The method of claim 4, wherein the bonding adhesive is an ultraviolet solidification adhesive.

* * * * *